US011261121B2

(12) United States Patent
Bookbinder et al.

(10) Patent No.: US 11,261,121 B2
(45) Date of Patent: Mar. 1, 2022

(54) OPTICAL FIBER PREFORMS WITH HALOGEN DOPING

(71) Applicant: Corning Incorporated, Corning, NY (US)

(72) Inventors: Dana Craig Bookbinder, Corning, NY (US); Steven Bruce Dawes, Corning, NY (US); Richard Michael Fiacco, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 201 days.

(21) Appl. No.: 16/165,633

(22) Filed: Oct. 19, 2018

(65) Prior Publication Data

US 2019/0119143 A1   Apr. 25, 2019

Related U.S. Application Data

(60) Provisional application No. 62/574,945, filed on Oct. 20, 2017.

(30) Foreign Application Priority Data

Nov. 9, 2017   (NL) ...................................... 2019876

(51) Int. Cl.
*C03B 37/014*   (2006.01)
*C03B 37/012*   (2006.01)
(Continued)

(52) U.S. Cl.
CPC .. *C03B 37/01446* (2013.01); *C03B 37/01262* (2013.01); *C03B 37/01453* (2013.01);
(Continued)

(58) Field of Classification Search
CPC .................................................... C03C 25/607
See application file for complete search history.

(56) References Cited

U.S. PATENT DOCUMENTS 5,053,068 A      10/1991  Kyoto et al.
5,478,371 A  *  12/1995  Lemaire .................. C03C 23/00
                                                                    65/384
(Continued)

FOREIGN PATENT DOCUMENTS

EP          1127857 A2      8/2001
EP          1431254 A2      6/2004
(Continued)

OTHER PUBLICATIONS

EP18201288.0 Search Report dated Mar. 14, 2019, European Patent Office, 4 Pgs.
(Continued)

*Primary Examiner* — Cynthia Szewczyk
(74) *Attorney, Agent, or Firm* — Kevin L. Bray

(57) ABSTRACT

Preparation of halogen-doped silica is described. The preparation includes doping silica with high halogen concentration, sintering halogen-doped silica to a closed-pore state, and subjecting the closed-pore silica body to a thermal treatment process and/or a pressure treatment process. The temperature of thermal treatment is sufficiently high to facilitate reaction of unreacted doping precursor trapped in voids or interstices of the glass structure, but is below temperatures conducive to foaming. Core canes or fibers drawn from halogen-doped silica subjected to the thermal treatment and/or pressure treatment show improved optical quality and possess fewer defects. The thermal treatment and/or pressure treatment is particularly advantageous when used for silica doped with high concentrations of halogen.

22 Claims, 10 Drawing Sheets

(51) Int. Cl.
*C03B 37/018* (2006.01)
*C03B 37/027* (2006.01)
*G02B 6/02* (2006.01)

(52) U.S. Cl.
CPC ...... *C03B 37/01807* (2013.01); *C03B 37/027* (2013.01); *G02B 6/02395* (2013.01); *C03B 2201/12* (2013.01); *C03B 2201/20* (2013.01); *C03B 2207/88* (2013.01)

(56) References Cited

U.S. PATENT DOCUMENTS

| | | | | |
|---|---|---|---|---|
| 5,713,979 | A | * | 2/1998 | Nicholson ........... C03B 19/1453 65/424 |
| 9,594,212 | B2 | | 3/2017 | Bookbinder et al. |
| 9,618,692 | B2 | | 4/2017 | Berkey et al. |
| 2003/0044144 | A1 | * | 3/2003 | Nelson ..................... G02B 6/04 385/123 |
| 2003/0079504 | A1 | | 5/2003 | Boek et al. |
| 2006/0115913 | A1 | * | 6/2006 | Orita ................. C03B 37/02754 438/22 |
| 2010/0251775 | A1 | * | 10/2010 | Regnier ................ C03C 25/607 65/400 |
| 2016/0016839 | A1 | | 1/2016 | Schwerin et al. |
| 2016/0304392 | A1 | | 10/2016 | Bookbinder et al. |
| 2017/0176673 | A1 | | 6/2017 | Berkey et al. |

FOREIGN PATENT DOCUMENTS

| | | |
|---|---|---|
| JP | 2003306342 A | 10/2003 |
| WO | 2016086013 A1 | 6/2016 |
| WO | 2016168042 A1 | 10/2016 |
| WO | 2017003982 A2 | 1/2017 |

OTHER PUBLICATIONS

International Search Report and Written Opinion PCT/US2018/056665 dated Jan. 30, 2019, 12 Pgs.
Bookbinder et al; "Low Loss Optical Fiber With Core Codoped With Two or More Halogens" Filed as U.S. Appl. No. 16/193,819 on Nov. 16, 2018; 35 Pages.
International Search Report of the International Searching Aurthority; Dutch Patent Application No. NL2019876; dated Jun. 28, 2018; 10 Pages.

* cited by examiner

OPTICAL FIBER PREFORMS WITH HALOGEN DOPING

This application claims the benefit of priority to Dutch Patent Application No. 2019876, filed on Nov. 9, 2017, which claims the benefit of priority to U.S. Provisional Application Ser. No. 62/574,945 filed on Oct. 20, 2017, the content of which is relied upon and incorporated herein by reference in its entirety.

FIELD

This description relates to optical fiber preforms doped with halogens and methods of making such preforms. More particularly, this description relates to core preforms for optical fibers doped with high concentrations of halogen that exhibit low foaming and seed formation during redraw.

BACKGROUND

Optical fiber performance depends on the ability to control refractive index profiles in low loss fiber media. Most typically, silica glass is used as the base medium for optical fibers used to transmit light over lengths ranging from several meters to hundreds of kilometers. Silica is a preferred base medium because it exhibits low attenuation in the 1300 nm to 1500 nm wavelength range commonly used to transmit optical signals. Attenuation losses in silica-based optical fibers are as low as 0.18 dB/km for typical single-mode optical fiber products. Optical loss is determined by the Rayleigh scattering of the silica-based medium, the concentration of impurities, and wavelength dependent factors such as UV and IR absorption tails.

Optical fibers include a central glass core surrounded by a glass cladding. The base glass medium for the core and cladding is typically silica. To achieve waveguiding, the core is configured to have a higher refractive index than the cladding. The refractive index of silica can be modified by doping. Various dopants are known that either increase or decrease the refractive index of silica relative to undoped silica. In most single mode silica fibers, germanium dioxide ($GeO_2$) is used to dope the core region. $GeO_2$ doping levels are typically adjusted to provide an increase in the relative refractive index of 0.35%. Although $GeO_2$ is a relatively expensive dopant, it comprises only about 8% by weight (wt %) of the core region of the fiber and only about 0.5 wt % of the total glass fiber (core+cladding). Germanium doping is also relatively easy to accomplish during laydown of silica preforms and complex refractive index profiles can be made simply by varying the ratio of silicon and germanium precursors supplied to the deposition system during the laydown process (typically an OVD silica soot deposition process). $SiCl_4$ and $GeCl_4$ are common precursors for forming Ge-doped silica glass in the preform laydown process. A drawback of using $GeO_2$ as an index-raising dopant for silica cores is that the presence of $GeO_2$ increases the Rayleigh scattering of the fiber relative to pure silica fibers. As a result, there is interest in identifying alternate dopants that enable the refractive index profile control of silica needed in optical fibers to achieve fibers with low Rayleigh scattering at reasonable cost.

Two approaches for producing ultralow loss fibers have been have been commercialized. In one approach, a silica core is modified by alkali doping at low concentration (e.g. 0.1 wt % $K_2O$ or less). The alkali doping concentration is designed to be (1) high enough to reduce Rayleigh scattering by lowering the viscosity of the glass to a degree sufficient to produce a fiber core with a low fictive temperature and (2) sufficiently low to avoid increases in Rayleigh scattering resulting from compositional inhomogeneities. Since alkali doping at low concentration does not lead to a significant increase in the refractive index of the core relative to undoped silica, the refractive index profile is controlled by doping a surrounding silica cladding with F (fluorine). The presence of fluorine in the silica cladding reduces the refractive index of the cladding relative to undoped silica and provides a mechanism for achieving the core-cladding refractive index contrast needed for effective waveguiding in an optical fiber. The process required to make fibers with alkali-doped cores is complicated and expensive, but attenuation of ~0.15 dB/km over selected wavelengths in the 1300 nm-1500 nm range is possible.

A second approach to making lower loss fiber is to use Cl (chlorine) as a dopant in the core. Since chlorine doping can be accomplished in the consolidation step of preform fabrication, process variables (e.g. preform size, silica precursor) affecting costs associated with core fabrication can be re-optimized. The presence of Cl in the core, even at concentrations >1 wt %, does not strongly influence the contribution of compositional inhomogeneity to Rayleigh scattering and fibers with Cl-doped cores can exhibit low losses due to Rayleigh scattering. Regarding control of the refractive index profile, data indicate that the addition of 1 wt % Cl to the core increases the relative refractive index by about 0.08%. Since a higher core index relative to undoped silica is preferred for efficient waveguiding, proper control of the refractive index profile requires doping of the cladding with a dopant that decreases the relative refractive index. Fiber with Cl-doped silica cores typically include silica cladding doped with about 0.5 wt %-1 wt % F (fluorine) to achieve the proper differential in core-cladding refractive index needed for efficient waveguiding. A fiber with a Cl-doped silica core and an F-doped silica clad exhibits attenuation losses of 0.16 dB/km or lower.

Doping of the silica cladding with F is a cost-intensive step that would be desirable to avoid. The need for F-doping of the cladding reflects a limitation in the maximum doping concentration of the core silica glass with Cl using conventional Cl doping processes. Under typical commercial process conditions, Cl doping of silica is limited to about 1 wt %. The relative refractive index increases associated with doping of a silica core with 1 wt % Cl is insufficient relative to an undoped silica glass cladding to provide the core-cladding index differential desired for an optical fiber. As a result, the cladding is doped with F to lower the cladding index to achieve the preferred core-cladding index differential. It would be preferable to achieve a core Cl doping concentration high enough to achieve a sufficiently high core-cladding index using undoped silica or lightly F-doped silica for the cladding.

Efforts are underway to further increase Cl doping levels in the core, but have been limited by practical considerations of process equipment. Current preform consolidation processes are run in furnaces that are equipped to supply vapor phase constituents at atmospheric pressure or less. Cl doping during consolidation using $SiCl_4$, or other silicon chloride species, appears to show a thermodynamic equilibrium that limits the concentration of Cl ([Cl]) incorporated in the core silica to an amount consistent with the empirical relation: [Cl](wt %)=$2.3*P_{SiCl4}^{1/4}$, where $P_{SiCl4}$ is the pressure (in units of atmosphere) of the Cl-doping precursor ($SiCl_4$) over the glass. As a result, in a process with a maximum pressure of 1 atmosphere, the highest attainable Cl doping concentration in silica is 2.3 wt %. The relative refractive index increase relative to undoped silica for 2.3 wt % Cl doping is only about 0.15% Δ, which is insufficient to achieve fibers having adequate effective area and low bend losses when undoped silica is used as the cladding material. F-doping of the cladding is thus needed to increase the core-cladding index differential. Cl doping levels on the order of 5 wt % or higher are needed to achieve a core refractive index sufficiently high to obviate the need for fluorine doping of the cladding and to permit the use of undoped silica as a cladding material. Predicted process pressures for Cl doping on the order of 5 to 50 atmospheres are needed to achieve Cl doping concentrations that are sufficiently high to permit use of undoped silica as a cladding material.

As Cl doping concentrations of silica increase, it becomes more difficult to insure complete reaction of the Cl doping precursor with silica. During consolidation of Cl-doped silica preforms, for example, unreacted Cl doping precursor becomes encapsulated or entrapped as bubbles (gas phase voids) in silica as the preform sinters and densifies. When the Cl-doped silica preform is intended for use as a preform for the core portion of an optical fiber, it is subjected to a redraw step to narrow and properly size the diameter of the preform to form a core cane. The core cane is subsequently used as s substrate for further deposition of soot to form a cladding or is integrated with a pre-fabricated cladding to form a fiber preform.

The presence of gas phase voids of unreacted Cl doping precursor leads to a deterioration in the core cane product formed in the redraw process. More specifically, the high temperatures (~1800° C.) associated with the redraw process cause evolution of unreacted Cl doping precursor from the consolidated preform. The evolution of Cl doping precursor leads to foaming of the preform, which impairs the optical transparency of both the core cane produced by the redraw process and the optical fiber ultimately drawn from the core cane.

It is desirable to develop an optical fiber preform having a silica core with high Cl doping that is highly transparent and free of voids and bubbles. It further desirable to develop an optical fiber preform having a silica core with high Cl doping that exhibits minimal foaming and minimal gas phase voids during redraw.

SUMMARY

Preparation of clear void-free or seed-free halogen-doped silica glass is described, wherein the halogen concentration is greater than 2 wt %. The preparation includes doping silica glass with high halogen concentration, sintering halogen-doped silica glass to a closed-pore state, and subjecting the closed-pore body to a thermal treatment process. The temperature of thermal treatment is sufficiently high to facilitate reaction of unreacted doping precursor trapped in voids or interstices of the glass structure, but is below temperatures conducive to foaming. Core canes or fibers drawn from halogen-doped silica glass subjected to the thermal treatment show improved optical quality and possess fewer defects. The thermal treatment is particularly advantageous when used for silica glass doped with high concentrations of halogen.

The present disclosure extends to:
A method of producing halogen-doped silica comprising:
doping a silica soot body with a doping precursor, the doping precursor comprising a halogen and having a partial pressure greater than 2 atm, the doping occurring at a temperature between 1000° C. and 1500° C.;
densifying the doped silica soot body to form a closed-pore silica body; the closed-pore silica body comprising silica doped with the halogen; and
exposing the closed-pore silica body to a gas for a time period of at least 1.0 hour, the gas having a pressure of at least 2.0 atm.

The present disclosure extends to:
A method of producing halogen-doped silica comprising:
doping a silica soot body with a doping precursor, the doping precursor comprising a halogen and having a partial pressure greater than 2 atm, the doping occurring at a temperature between 1000° C. and 1500° C.;
densifying the doped silica soot body to form a closed-pore silica body; the closed-pore silica body comprising silica doped with the halogen; and
heating the closed-pore silica body at a temperature in the range from 1000° C.-1500° C. for a time period of at least 1.0 hour.

The present disclosure extends to:
A method of producing halogen-doped silica comprising:
heating a closed-pore body comprising halogen-doped silica at a temperature in the range from 1000° C.-1500° C. for a time period of at least 1.0 hour.

The present disclosure extends to:
A method of producing halogen-doped silica comprising:
exposing a closed-pore body comprising halogen-doped silica to a gas having a pressure of at least 2.0 atm for a time period of at least 1.0 hour.

The present disclosure extends to glasses made from the methods disclosed herein.

The present disclosure extends to halogen-doped silica made from the methods disclosed herein.

The present disclosure extends to optical fibers comprising glasses made from the methods disclosed herein.

The present disclosure extends to optical fibers comprising halogen-doped silica made from the methods disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
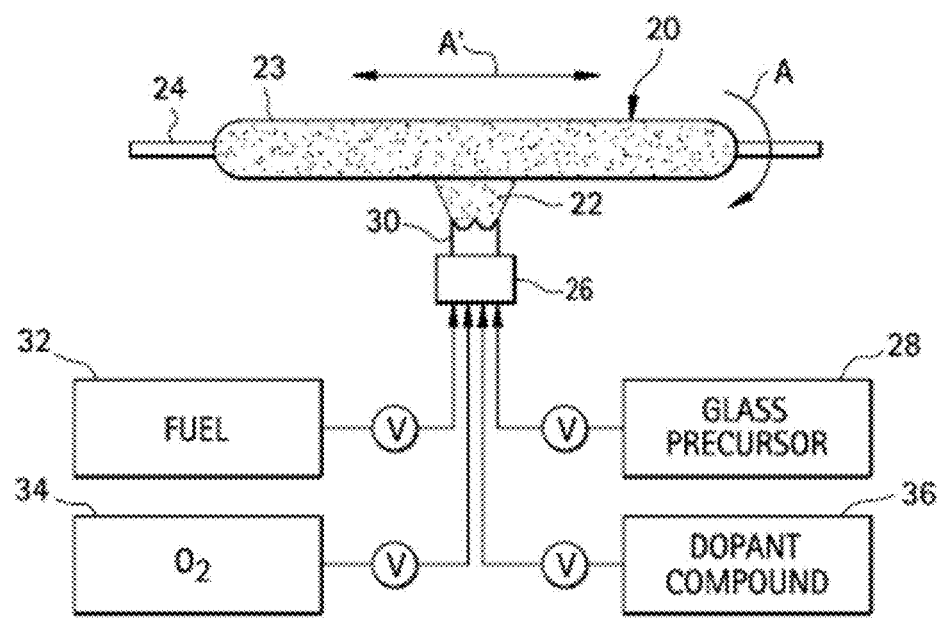
FIG. 1 is a schematic depiction of soot preform deposition via an OVD process.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The term "updopant" refers to an index-raising dopant and the term "downdopant" refers to an index-lowering dopant. When an updopant is incorporated into a base material, the refractive index of the doped material is higher than the refractive index of the base material. Updoped silica, for example, has a higher refractive index than undoped silica. When a downdopant is incorporated into a base material, the refractive index of the doped material is lower than the refractive index of the base material. Updoped silica, for example, has a higher refractive index than undoped silica. Downdoped silica, for example, has a lower refractive index than undoped silica. Updopants for silica include Cl and Ge. Downdopants for silica include B and F. Silica doped with an updopant is referred to as "updoped silica" and silica doped with a downdopant is referred to as "downdoped silica". The process of incorporating an updopant into a base composition is referred to as "updoping" and the process of incorporating a downdopant into a base composition is referred to as "downdoping".

Reference will now be made in detail to illustrative embodiments of the present description.

In a continuous optical fiber manufacturing process, an optical fiber is drawn from a heated preform positioned in a draw furnace. After drawing from the preform, the fiber is passed through a series of processing stages. Processing stages typically include metrology units (e.g. fiber diameter control) to assess quality and other characteristics of the optical fiber, heating stages, a primary coating stage, a secondary coating stage, an ink layer stage, and a spool or other winding stage to receive and store the coated optical fiber.

The properties of the optical fiber are determined to a large degree by the characteristics of the preform. The preform is a dense glass monolith with a diameter of about 27 cm and a length of about 200 cm. The preform includes a central core region surrounded by an annular cladding region. The composition of the core and cladding regions of the preform correspond to the compositions of the core and cladding regions of an optical fiber drawn from the preform. The core is typically silica doped with an updopant and the cladding is typically undoped silica or silica doped with a downdopant. The diameter of the core region of the preform and the thickness of the cladding region of the preform are in proportion to the core diameter and cladding thickness of a fiber drawn from the preform. For single mode fiber, the core diameter is typically ~8-15 µm and the cladding thickness is typically ~50 µm. The core region and/or cladding region of the preform may include multiple concentric layers that differ in dopant type or dopant concentration to provide optical fibers having a desired refractive index profile. Examples include a cladding region with an inner cladding region, trench region, and/or an outer cladding region.

Silica and doped silica for the core and cladding regions of an optical fiber preform can be produced by methods known in the art. Suitable methods include: flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot method, and doped deposited silica processes. A variety of CVD (chemical vapor deposition) and plasma-enhanced CVD processes are known and are suitable for producing silica or doped silica.

Formation of silica occurs through reaction or decomposition of a silica precursor. Suitable precursors for silica include OMCTS (octamethylcyclotetrasiloxane) and $SiCl_4$. Doping is accomplished with a doping precursor. The doping precursor can be introduced with the silica precursor in the deposition process or used to treat a silica body formed from the silica precursor. Preferred doping precursors include halogen-containing gases. Suitable precursors for doping silica with bromine include $SiBr_4$. Suitable precursors for doping silica with chlorine include $Cl_2$, $SiCl_4$, $Si_2Cl_6$, $Si_2OCl_6$, and $CCl_4$. Suitable precursors for doping silica with fluorine include $F_2$, $CF_4$, and $SiF_4$. The silica precursor and/or doping precursor is preferably provided as a gas to the deposition process. The gas phase silica precursor or gas phase doping precursor is supplied undiluted or in combination with an inert diluent gas (e.g. He, $N_2$, Ar).

Figure 2:
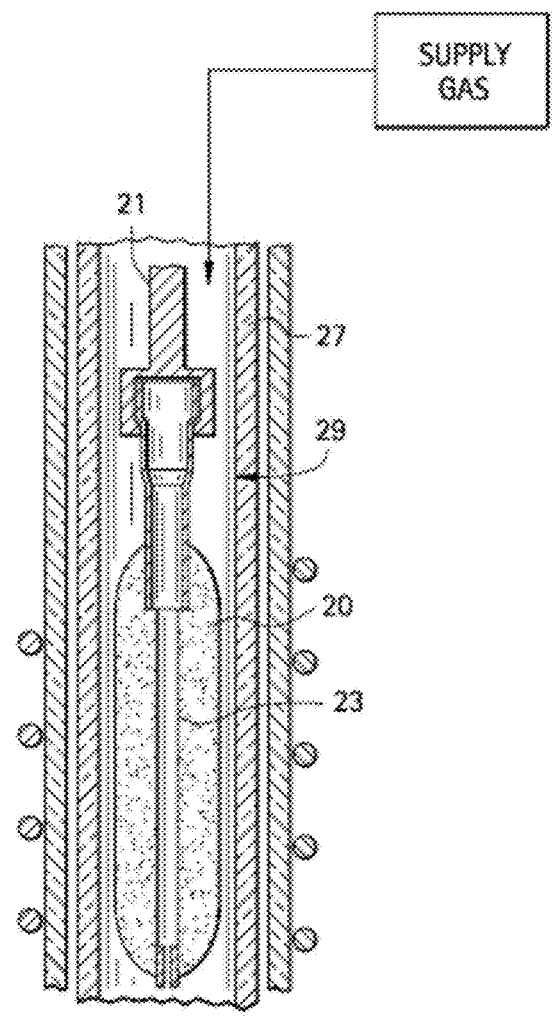
FIG. 2 depicts an apparatus for doping and consolidating a soot preform.

By way of illustration and not intended to be limiting, formation of a silica or doped silica in the form of a core soot body according to the OVD method is illustrated in FIGS. 1 and 2. In FIG. 1, core soot body 20 is formed by depositing silica-containing soot 22 onto the outer surface of a rotating and translating mandrel 24. Mandrel 24 is preferably tapered. The soot 22 for core soot body 20 is formed by providing a glass/soot precursor 28 in gaseous form to the flame 30 of a burner 26 to oxidize, hydrolyze, combust, or otherwise react or decompose it. Fuel 32, such as methane ($CH_4$), and a combustion supporting gas 34, such as oxygen, are provided to the burner 26 and ignited to form the flame 30. Mass flow controllers, labelled V, meter the appropriate amounts of glass/soot precursor 28, fuel 32 and combustion supporting gas 34, all preferably in gaseous form, to the burner 26. The glass/soot precursor 28 is a glass former compound (e.g. silica precursor) and is oxidized in the flame 30 to form a generally cylindrically-shaped core soot region 23. A core soot body comprising silica (doped or undoped) is referred to herein as a silica soot body.

After forming the core soot body, as illustrated in FIG. 2, the core soot body 20 is optionally doped (e.g. with bromine, chlorine, fluorine) and consolidated in consolidation furnace 29 to form a core preform. Prior to consolidation, the bait rod 24 illustrated in FIG. 1 is removed to form a hollow, cylindrical core soot body. During the doping and consolidation process, the core soot body 20 is suspended, for example, inside a pure quartz muffle tube 27 of the furnace 29 by a holding mechanism 21. Prior to or during the consolidation step, the core soot body 20 is optionally exposed to a doping precursor. The doping precursor is preferably provided in gas-phase form and is supplied directly to core soot body 20 before or during consolidation. In one embodiment, the gas-phase doping precursor is a vapor formed by heating or evaporating a liquid precursor. The doping precursor is supplied neat (undiluted) or in combination with a diluent gas. The doping concentration can be controlled by controlling, without limitation, the temperature of doping, the temperature of vaporization of a liquid doping precursor, the pressure or partial pressure of a gas-phase doping precursor in the processing ambient of the core soot body, time of doping, number of doping cycles, and the porosity or surface area of the core soot body (high porosity and/or high surface area promote higher doping concentrations).

The pressure or partial pressure of a doping precursor in a gas phase during doping is preferably at least 1.0 atm, or at least 2.0 atm, or at least 5.0 atm, or at least 10 atm, or at least 15 atm, or in the range from 1.0 atm-50 atm, or in the range from 2.0 atm-45 atm, or in the range from 3.0 atm-40 atm, or in the range from 5.0 atm-35 atm.

Figure 3:
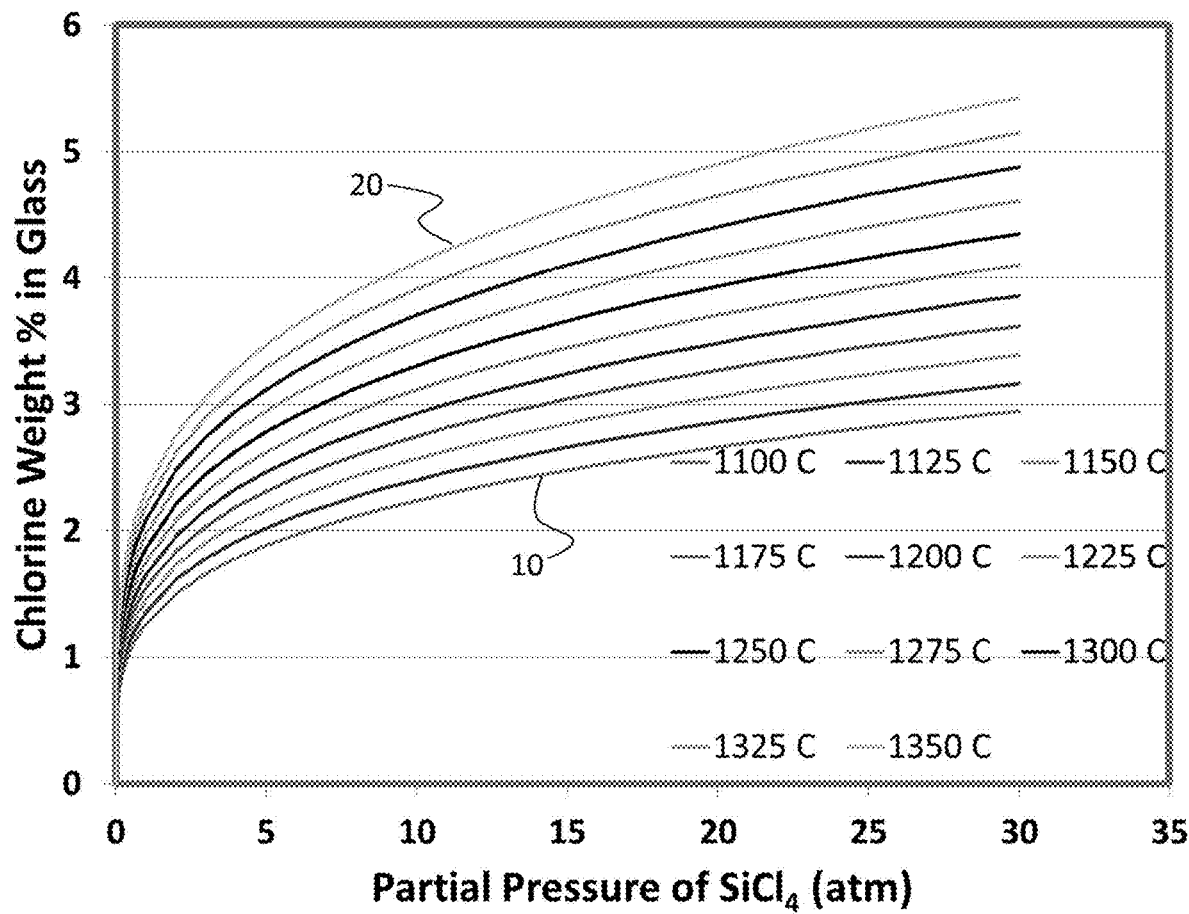
FIG. 3 shows the Cl dopant concentration in silica glass under various doping conditions in an OVD process.

FIG. 3 shows the Cl dopant concentration in silica glass made using the doping precursor $SiCl_4$. The Cl concentration corresponds to the theoretical equilibrium concentration in silica glass after consolidation and is shown as a function of the partial pressure of the doping precursor $SiCl_4$ for various doping temperatures. Depending on the doping temperature and partial pressure of $SiCl_4$, Cl concentrations up to about 6.5 wt % are achievable. The preferred Cl concentration in preforms (core preform, cladding preform, or combination thereof) or closed-pore bodies made from silica glass is at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or at least 5.0 wt %, or in the range from 1.5 wt %-5.5 wt %, or in the range from 2.0 wt %-5.0 wt %, or in the range from 2.5 wt %-4.5 wt %, or in the range from 3.0 wt %-4.0 wt %. In some embodiments, the partial pressure of $SiCl_4$ at which the chlorine doping is performed is greater than 30 atmospheres. In other embodiments, the partial pressure of $SiCl_4$ at which the chlorine doping is performed is greater than 40 atmospheres. In still embodiments, the partial pressure of $SiCl_4$ at which the chlorine doping is performed is greater than 45 atmospheres. In some embodiments, the Cl concentration in preform is greater than 5 wt %. In other embodiments, the Cl concentration in preform is greater than 6 wt %. In still other embodiments, the Cl concentration in preform is greater than 6.5 wt %.

Figure 4:
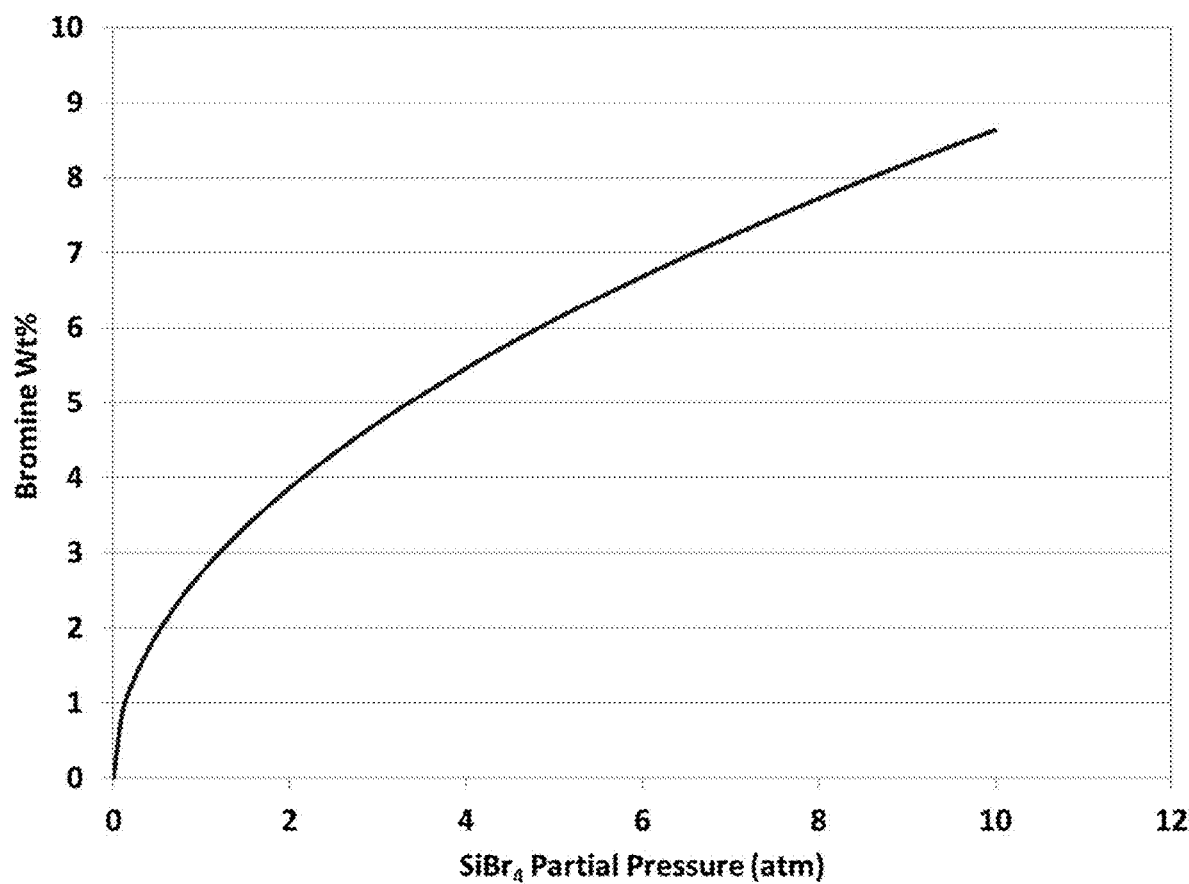
FIG. 4 shows the Br dopant concentration in silica glass under various doping conditions in an OVD process.

FIG. 4 shows the Br dopant concentration in silica glass made by an OVD process using the doping precursor $SiBr_4$. A downdrive process was used for $SiBr_4$ doping. The Br concentration corresponds to the concentration in silica glass after consolidation and is shown as a function of the partial pressure of the doping precursor $SiBr_4$ for a doping temperature near the temperature at which the closed-pore state is achieved (approximately 1330° C. Doping concentrations up to 8.5 wt % Br are achievable. The preferred Br concentration in preforms (core preform, cladding preform, or combination thereof) or closed-pore bodies made from silica glass is at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or in the range from 1.0 wt %-8.5 wt %, or in the range from 1.5 wt %-7.0 wt %, or in the range from 2.0 wt %-5.5 wt %, or in the range from 2.5 wt %-4.5 wt %.

During or after the doping step, the core soot body is sintered to densify the core soot body to form a closed-pore core body. As used herein, a closed-pore state of silica is a state having a density of at least 1.90 g/cm³. In embodiments, the closed-pore state of silica is a state having a density of at least 1.95 g/cm³, or at least 2.00 g/cm³, or at least 2.05 g/cm³, or at least 2.10 g/cm³, or at least 2.15 g/cm³. A body in a closed-pore state is referred to herein as a closed-pore body. In one embodiment, the sintering process is an isothermal process in which the sintering temperature is in the range from 1100° C. to 1600° C., or in the range from 1000° C. to 1500° C., or in the range from 1350° C. to 1550° C., or in the range from 1250° C. to 1450° C., or in the range from 1380° C. to 1500° C., or in the range from 1280° C. to 1400° C. over a time period in the range from 30 min to 240 min, or in the range from 45 min to 210 min, or in the range from 60 min to 180 min, or in the range from 90 min to 150 min. An isothermal sintering process may be preferred when the doping precursor is supplied as a neat gas or vapor. In another embodiment, the sintering process is a downdrive process in which a sintering front is established by localized heating and the doping precursor is provided at the sintering front at a concentration (neat or in combination with a diluent) sufficient to accommodate the equilibrium solubility. Depending on the size of the soot body, the thermal conductivity of the soot body, and the heating (downdrive) rate of the soot body, the sintering front may include a radial temperature gradient. That is, at the sinter front, the outer surface of the soot body is exposed to high temperatures and heated and heating of the interior portion follows in time as heat transfers from the outer surface to the interior of the soot body. Sintering transforms the core soot body to a densified, closed-pore state.

The OVD method described above can also be used to form a cladding soot body from a silica precursor and a doping precursor as well as a closed-pore state for the cladding soot body. Multilayer core soot bodies and multilayer cladding soot bodies can be obtained by varying the doping conditions during soot deposition. Doping conditions include time of doping, doping precursor, temperature of doping, and pressure of doping. Layers that differ in thickness, dopant, and doping concentration can be deposited concentrically when forming a core soot body or a cladding soot body.

The optical fiber preform is densified glass that includes a core region and a cladding region. Various methods for forming an optical fiber preform are known. In the OVD method described above, for example, one or more concentric core soot layers can be formed, one or more concentric cladding soot layers can be formed on the outermost of the one or more concentric core layers, and the resulting soot body can be sintered to a closed-pore state to provide a preform with a central core region surrounded by an annular cladding region.

In another method, a core soot body is formed, the core soot body is sintered to a closed-pore state, one or more concentric layers of cladding soot are deposited on the closed-pore core body, and the one or more concentric layers of cladding soot are sintered to a closed-pore state to provide a preform with a central core region surrounded by an annular cladding region.

In a further method, a core soot body is formed and sintered to a closed-pore state. A cladding soot body or a closed-pore cladding body is formed independent of the closed-pore core body. The closed-pore core body is then integrated with the cladding soot body or closed-pore cladding body and consolidated to provide a preform with a central core region surrounded by an annular cladding region. By way of example, a cladding soot body (with one or more layers of one or more compositions) can be formed by soot deposition on a mandrel. Upon completion of soot deposition, the mandrel is removed to provide an annular cladding soot body with a central cavity. A closed-pore core body is then inserted in the central cavity and the resulting assembly is consolidated to densify the soot cladding to form a preform with a central core region surrounded by an annular cladding region.

During preform fabrication or optical fiber manufacture, it is often necessary to heat closed-pore bodies to temperatures above the sintering temperature. Drawing a fiber from a preform, for example, typically requires heating the preform to temperatures of ~1800° C. to soften it so that a fiber can be pulled from the preform. As a second example, formation of a preform from a closed-pore core body often requires sizing the closed-pore core body to a specified diameter. From a process economics standpoint, it is preferable to form a large diameter closed-pore core body and to then reduce the dimensions of the closed-pore core body to the desired diameter. After diameter reduction, the closed-pore core body can be cut to a desired length to form a core cane. The core cane can be used as a substrate for deposition of one or more layers of cladding soot or integrated with a cladding soot body or closed-pore cladding body as described above to form a preform. The process of forming a core cane from a closed-pore core body requires heating the closed-pore core body to a temperature of ~1800° C. to soften it so that it can be pulled and thinned to a specified diameter. The process of forming a core cane from a closed-pore core body is referred to herein as a "redraw process" or "redrawing".

The present inventors have determined that drawing fibers from preforms having a closed-pore core region and a closed-pore cladding region and redrawing closed-pore core bodies to form core canes leads to degradation in the closed-pore region or closed-pore body when the closed-pore region or closed-pore body is made from silica glass with a high halogen doping concentration. Without wishing to be bound by theory, it is believed that the degradation observed during the heating needed for drawing fibers or redrawing core canes leads to evolution (e.g. evaporation, exolution, or other release from the closed-pore structure) or migration (e.g. diffusion or other motion within the closed-pore structure) of gases trapped in the closed-pore structure and that such evolution or migration leads to formation of gas phase voids in the closed-pore structure or foaming of the closed-pore structure.

The following discussion describes the degradation in the context of redrawing closed-pore core bodies to form core canes for Cl-doped silica glass prepared using $SiCl_4$ as a doping precursor. It should be understood, however, that the discussion applies analogously to closed-pore bodies generally and in particular to closed-pore core and closed-pore cladding regions of a fiber preform. The discussion further applies to halogen dopants other than Cl and to doping precursors other than $SiCl_4$.

Figure 5:
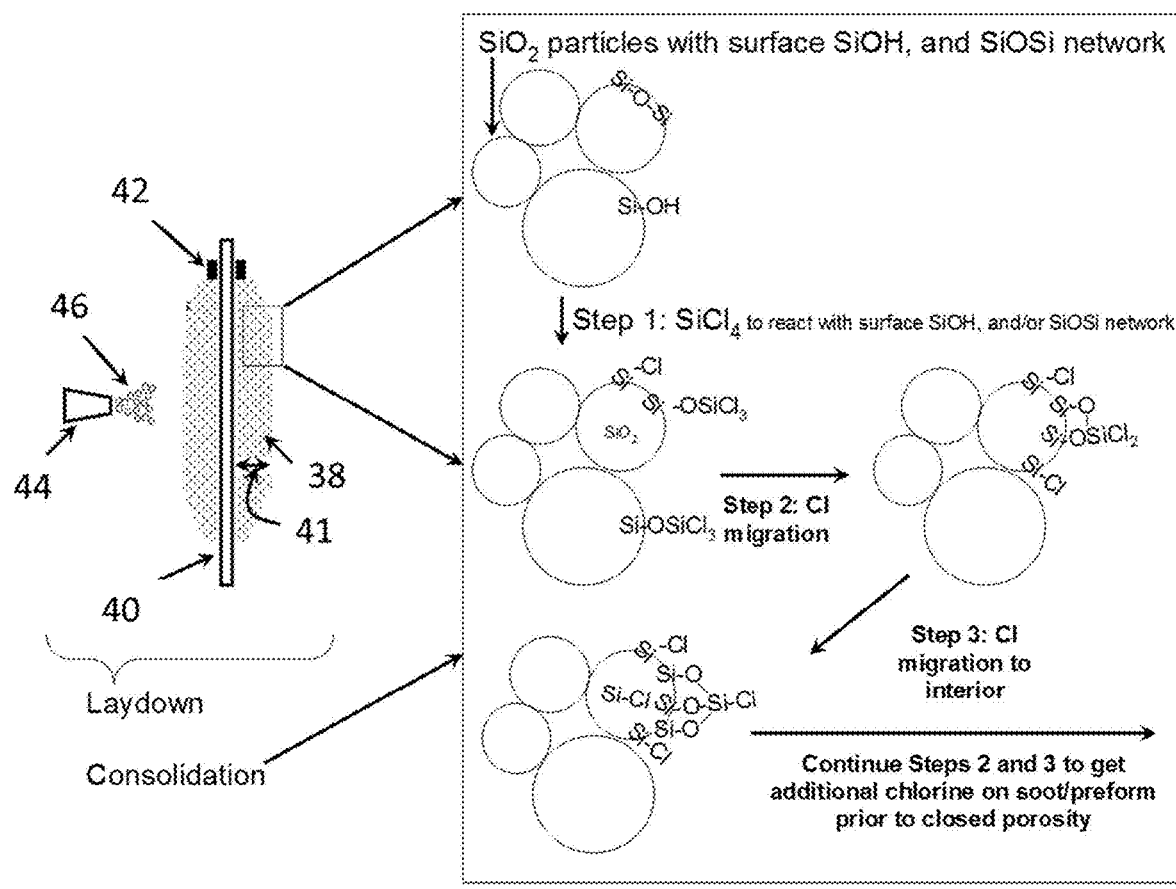
FIG. 5 depicts evolution of the structure of a silica soot body during doping with Cl.

FIG. 5 illustrates the process of doping a core soot body formed by an OVD process with Cl using $SiCl_4$ as a doping precursor. Core soot body 38 is formed on removable mandrel 40, which is held by handle 42, via deposition of silica soot particles 46 produced from a silica precursor combusted by burner 44. Core soot body 38 has thickness 41. The right side of FIG. 5 shows an enlargement of core soot body 38 and the evolution of structure during Cl doping. Core soot body 38 is a porous (open pore) silica body and doping occurs by exposing core soot body 38 to vapor phase $SiCl_4$. In a first step of the doping process, the $SiCl_4$ reacts with Si—OH and Si—O—Si groups on the surface of the core soot body to form Si—Cl and Si—O—$SiCl_3$ bonds on the surface. As doping proceeds, additional Cl bonds form on the surface and Cl migrates along the surface to produce a higher concentration and more uniform coverage of the surface with Cl. At later times in the doping process, Cl migrates from the surface to the interior of the core soot body. The process is continued by providing a fresh supply of $SiCl_4$ and controlling the doping conditions to achieve a desired doping concentration. Doping is preferably completed while the core soot body remains in an open-pore state.

As pores close the core soot body transforms from an open-pore state to a closed-pore state. In the open-pore state, continuous channels exist within the structure of the core soot body and the doping precursor distributes throughout the structure of the core soot body. As pores close during sintering, the channels narrow and seal to form a series of discrete, non-continuous voids as the closed-pore structure is produced. Due to the high viscosity of the glass, a portion of the vapor phase $SiCl_4$ gets encapsulated in unreacted form in the structure and becomes trapped in voids or interstitial regions of the closed-pore structure. It is believed that evolution of trapped $SiCl_4$ at the high temperatures encountered during subsequent redrawing or drawing processes leads to degradation of the closed-pore core body.

Figure 6:
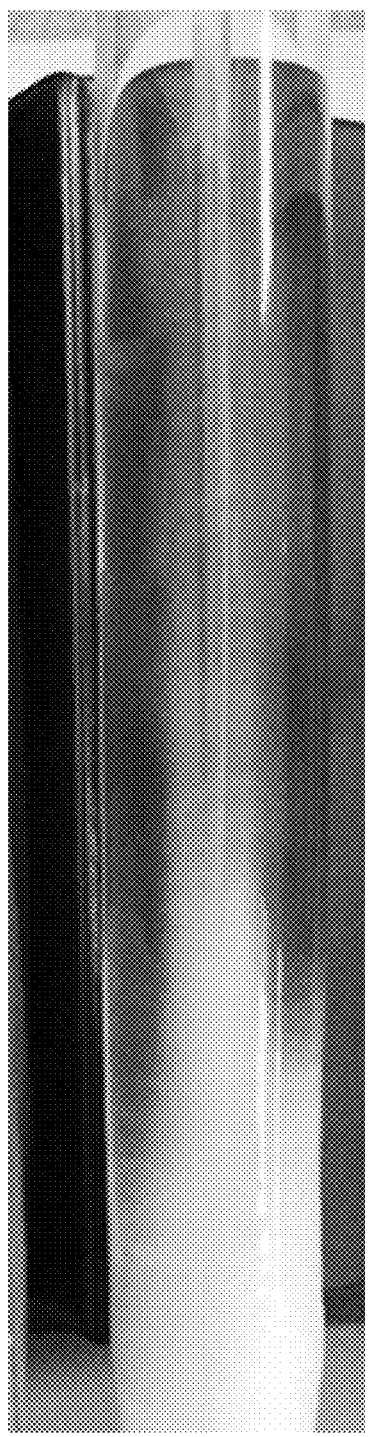
FIG. 6 shows a closed-pore Cl-doped silica body.

FIG. 6 shows a closed-pore core body of Cl-doped silica glass. The closed-pore core body was made in an OVD process using OMCTS as the silica precursor and $SiCl_4$ as the doping precursor for Cl. A silica soot body was formed on a mandrel and then exposed to $SiCl_4$ to achieve Cl doping. The doping conditions included a partial pressure of $SiCl_4$ of 5.8 atm and a hold time of 90 min at 1440° C. Sintering of the core soot body to a closed-pore state occurred during doping. The closed-pore body was cooled to room temperature. FIG. 6 shows the resulting closed-pore body. The Cl concentration of the closed-pore body was 3.3 wt %. Optical inspection of the closed-pore body revealed the presence of gas phase voids throughout the volume of the closed-pore body. The white haze shown in the lower part of the closed-pore body corresponds to regions having a particularly high concentration of voids. When the closed-pore body shown in FIG. 6 was heated to about 1800° C. in a redraw process, extensive foaming was observed and a hazy core cane was produced (see FIG. 10).

The present disclosure provides a method to reduce or eliminate foaming or other degradation of closed-pore bodies that occurs when drawing fibers or redrawing to form core canes. The method recognizes the presence of gas(es) trapped in voids or interstices of closed-pore bodies and recognizes that release of trapped gas(es) from voids or interstices of closed-pore bodies upon heating leads to foaming and other degradation. The present method accordingly is directed to inducing reaction of trapped gas(es) with the glass structure to integrate the trapped gas(es) in the structure of the glass before exposing the closed-pore body to temperatures conducive to liberating trapped gas(es) in a manner that causes foaming or degradation.

In one embodiment, the present method includes thermal treatment of a closed-pore body. The thermal treatment drives reaction of trapped gas-phase doping precursor(s) with the glass structure further to completion. The reaction leads to formation of one or more covalent bonds of trapped doping precursor with the glass and prevents release of the doping precursor upon subsequent processing to draw a fiber or redraw a core cane. As trapped doping precursor reacts, voids become depleted and collapse.

The thermal treatment is applied to a closed-pore body. As noted in an embodiment above, a closed-pore body is formed in an OVD process. A soot body (e.g. core soot body or cladding soot body) is formed and sintered to form a closed-pore body (e.g. closed-pore core body or closed-pore cladding body). In the prior art, the closed-pore body formed upon sintering is directly heated to temperatures well above the sintering temperature (e.g. ~1800° C.) for drawing a fiber or redrawing a core cane. As described in connection with FIG. 6, direct heating leads to foaming and degradation of the closed-pore body. While not wishing to be bound by theory, the present disclosure attributes the foaming and degradation to abrupt expansion and/or release of gas(es) trapped in the structure (voids or interstices) of the closed-pore body. It is believed that heating to the temperatures need to draw a fiber or redraw a core cane from the closed-pore body occurs too rapidly for trapped gas(es), in particular trapped unreacted doping precursor (e.g. $SiCl_4$), to react with, bond to, or otherwise integrate with the glass structure.

The present thermal treatment of closed-pore bodies furthers the reaction of unreacted gas(es), including trapped unreacted doping precursors, with the glass structure. The reaction stabilizes the trapped doping precursors through bonding to the glass structure, reduces void volume, and reduces foaming and degradation upon subsequent heating to the temperatures required for drawing fibers or redrawing core canes. The thermal treatment is applied to a closed-pore body and occurs at temperatures below temperatures needed to induce foaming or degradation of the closed-pore body. In one embodiment, the closed-pore body is formed by forming a soot body, exposing the soot body to a doping precursor to dope the soot body, and sintering the doped soot body to a closed-pore state. Once in the closed-pore state, the thermal treatment is applied to advance the reaction of trapped doping precursor with the glass structure. When the thermally-treated closed-pore body is subsequently heated to the temperatures required for draw or redraw, little or no foaming occurs and optical fibers and core canes with fewer defects result.

Figure 7:
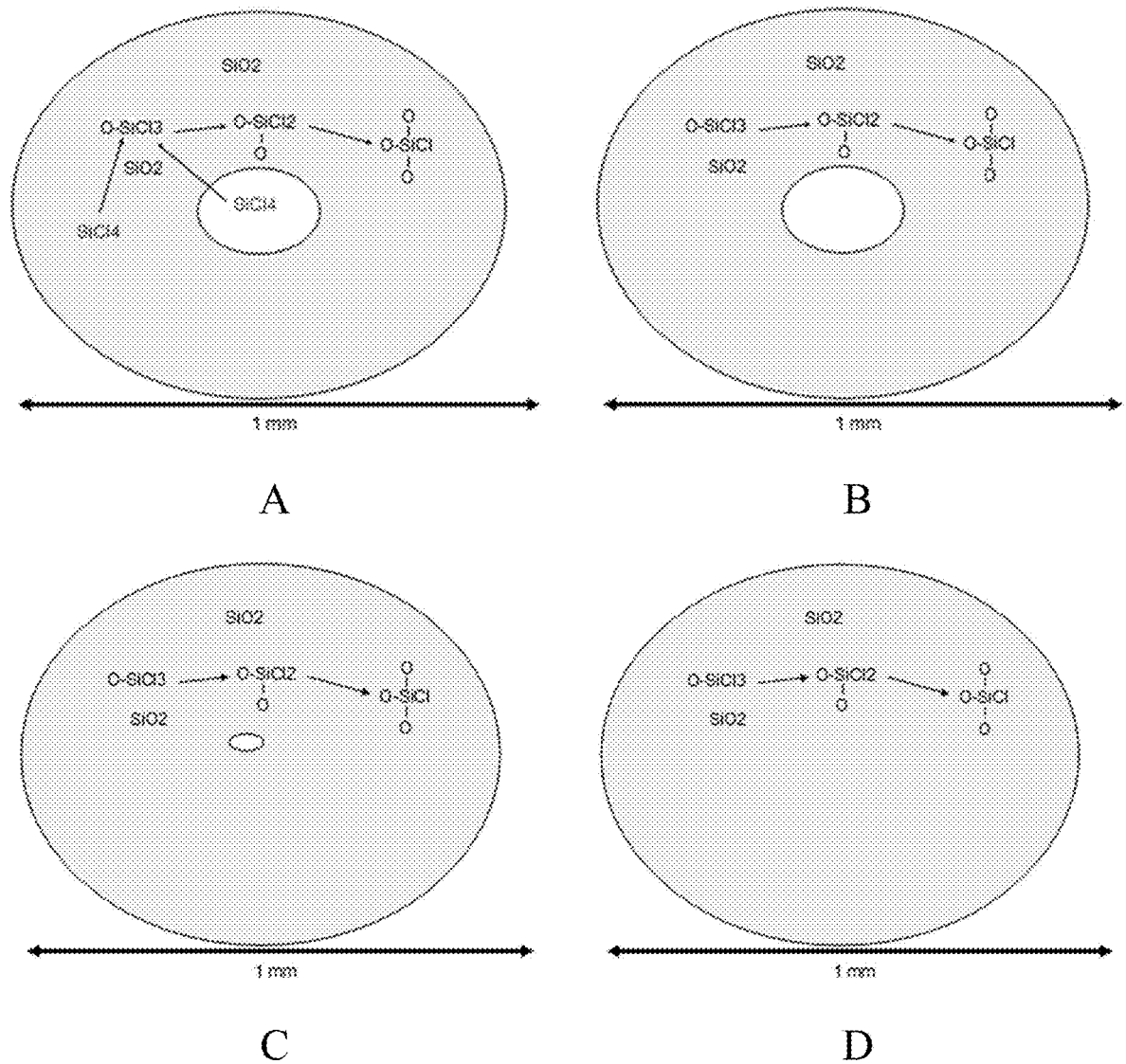
FIGS. 7A-7D show evolution of the structure of a closed-pore body upon thermal treatment.

FIGS. 7A-7D show evolution of the structure of a closed-pore body upon thermal treatment. FIG. 7A is a schematic of the structure of a closed-pore body on a length scale of about 1 mm. The closed-pore body is Cl-doped silica glass. The grayscale portion of the structure corresponds to silica glass with Cl dopant integrated into the structure. The white central portion of the structure represents a void that contains unreacted $SiCl_4$ doping precursor. The $SiCl_4$ indicated in the glass structure represents interstitial unreacted $SiCl_4$ doping precursor. Multiple voids and interstices containing $SiCl_4$ are present throughout the glass structure. FIGS. 7B-7D show variations in the closed-pore body during thermal treatment. In the early stages of thermal treatment, unreacted $SiCl_4$ is induced to migrate from void or interstitial positions and react with the glass structure. The reaction leads to formation of covalent bonds with the glass structure as Cl and chlorinated silicon fragments derived from $SiCl_4$ bond to the glass structure. The degree of chlorination and doping concentration of Cl in the glass structure increases, while voids and interstices become depleted of $SiCl_4$. FIGS. 7B-7D show collapse of a void as thermal treatment progresses. The glass structure resulting from the thermal treatment is free or nearly free of voids and unreacted $SiCl_4$ doping precursor (FIG. 7D). When the thermally treated closed-pore body shown in FIG. 7D is subsequently heated to high temperature for draw or redraw, little or no foaming occurs.

Figure 8:
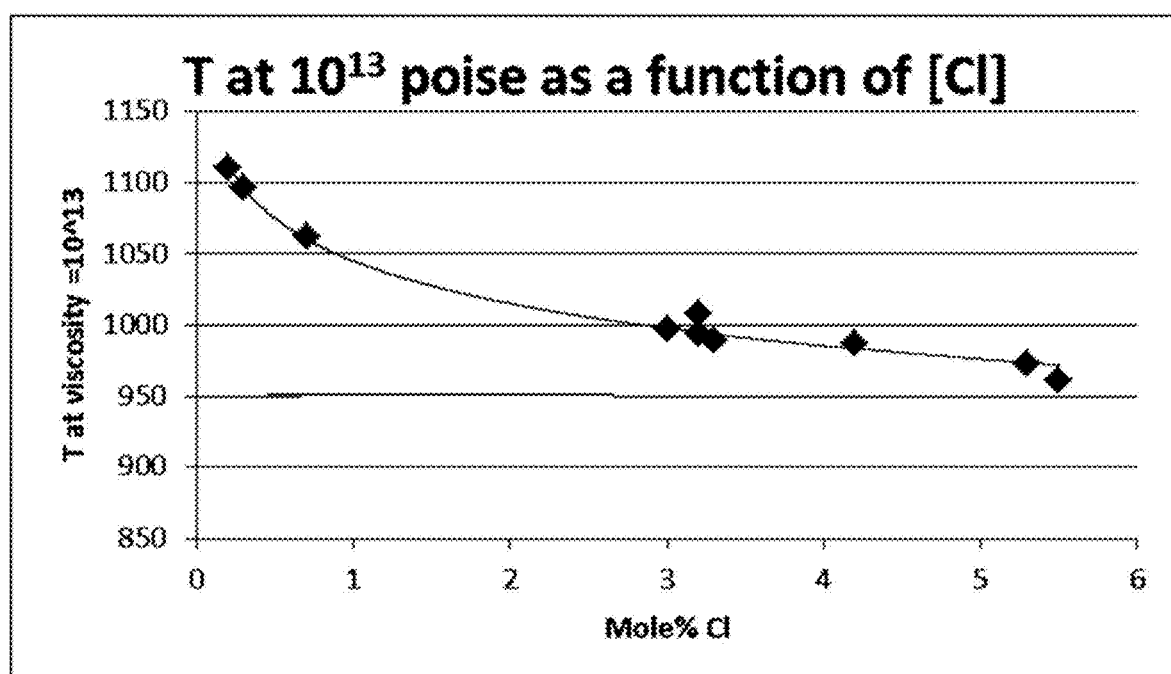
FIG. 8 shows viscosity data for Cl-doped silica glass.

Temperatures of the thermal treatment of the closed-pore body are sufficiently high to facilitate reaction of unreacted doping precursor with the glass structure, but below the temperature at which foaming occurs. It is believed that foaming becomes more problematic as the viscosity of glass decreases. As is known in the art, heating of glass reduces viscosity. When glass containing unreacted gases in voids or interstices is heated and the viscosity of the glass decreases below a foaming threshold, release of the gases causes foaming. Halogen dopants exacerbate foaming because the presence of halogens in the structure of silica glass reduces the viscosity of silica glass. FIG. 8, for example, shows the effect of Cl doping on the viscosity of silica glass. The temperature at which the viscosity of Cl-doped silica glass is $10^{13}$ Poise as a function of Cl doping concentration is shown. The data indicate that as the doping concentration of Cl increases the temperature at which the viscosity is $10^{13}$ Poise decreases. The data show that the viscosity of Cl-doped silica glass at a particular temperature decreases with increasing Cl doping concentration. Since the severity of foaming increases as glass viscosity decreases, the data indicate that foaming becomes more problematic as the doping concentration of Cl increases. As a result, as Cl doping concentration increases, it becomes necessary to carefully control the thermal environment of the glass to avoid foaming. The thermal treatment described herein is completed at temperatures below temperatures at which the viscosity of the glass is reduced to a degree that leads to appreciable foaming as unreacted doping precursor migrates in the glass.

The thermal treatment described herein is effective in reducing or preventing foaming in silica glass doped with a halogen dopant, where the concentration of the halogen dopant in silica glass is greater than 1.0 wt %, or greater than 1.5 wt %, or greater than 2.0 wt %, or greater than 2.5 wt %, or greater than 3.0 wt %, or in the range from 1.0 wt %-6.5 wt %, or in the range from 1.5 wt %-6.0 wt %, or in the range from 2.0 wt %-5.5 wt %, or in the range from 2.0 wt %-5 wt %, or in the range from 2.0 wt %-4.5 wt %.

Temperatures of thermal treatment are in the range from 1000° C.-1500° C., or in the range from 1000° C.-1450° C., or in the range from 1000° C.-1400° C., or in the range from 1000° C.-1350° C., or in the range from 1000° C.-1300° C., or in the range from 1050° C.-1500° C., or in the range from 1050° C.-1450° C., or in the range from 1050° C.-1400° C., or in the range from 1050° C.-1350° C., or in the range from 1050° C.-1300° C., or in the range from 1100° C.-1500° C., or in the range from 1100° C.-1450° C., or in the range from 1100° C.-1400° C., or in the range from 1100° C.-1350° C., or in the range from 1100° C.-1300° C., or in the range from 1300° C.-1500° C., or in the range from 1300° C.-1450° C., or in the range from 1300° C.-1400° C., or in the range from 1350° C.-1500° C., or in the range from 1400° C.-1500° C.

The time period of thermal treatment at a thermal treatment temperature is at least 1.0 hour, or at least 2.0 hours, or at least 3.0 hours, or at least 4.0 hours, or at least 6.0 hours, or at least 8.0 hours, or at least 12.0 hours, or at least 16.0 hours, or at least 20.0 hours, or in or in the range from 1.0 hour-48 hours, or the range from 1.0 hour-24 hours, or in the range from 1.0 hour-20 hours, or in the range from 1.0 hour-16 hours, or in the range from 1.0 hour-12 hours, or in the range from 1.0 hour-8.0 hours, or in the range from 2.0 hours-48 hours, or the range from 2.0 hours-24 hours, or in the range from 2.0 hours-20 hours, or in the range from 2.0 hours-16 hours, or in the range from 2.0 hours-12 hours, or in the range from 2.0 hours-8.0 hours, or in the range from 4.0 hours-48 hours, or the range from 4.0 hours-24 hours, or in the range from 4.0 hours-20 hours, or in the range from 4.0 hours-16 hours, or in the range from 4.0 hours-12 hours, or in the range from 4.0 hours-8.0 hours.

In an embodiment, the thermal treatment under the foregoing conditions is followed by secondary thermal processing at a temperature in the range from 1300° C.-1600° C., or in the range from 1300° C.-1550° C., or in the range from 1300° C.-1500° C., or in the range from 1350° C.-1600° C., or in the range from 1350° C.-1550° C., or range from 1350° C.-1500° C., or in the range from 1400° C.-1600° C., or in the range from 1400° C.-1550° C., or in the range from 1450° C.-1600° C., or in the range from 1450° C.-1550° C. In an embodiment, commencement of the secondary thermal processing occurs after conclusion of the thermal treatment.

The time period of the secondary thermal process is at least 1.0 hour, or at least 2.0 hours, or at least 3.0 hours, or at least 4.0 hours, or at least 6.0 hours, or at least 8.0 hours, or at least 12.0 hours, or at least 16.0 hours, or at least 20.0 hours, or in or in the range from 1.0 hour-48 hours, or the range from 1.0 hour-24 hours, or in the range from 1.0 hour-20 hours, or in the range from 1.0 hour-16 hours, or in the range from 1.0 hour-12 hours, or in the range from 1.0 hour-8.0 hours, or in the range from 2.0 hours-48 hours, or the range from 2.0 hours-24 hours, or in the range from 2.0 hours-20 hours, or in the range from 2.0 hours-16 hours, or in the range from 2.0 hours-12 hours, or in the range from 2.0 hours-8.0 hours, or in the range from 4.0 hours-48 hours, or the range from 4.0 hours-24 hours, or in the range from 4.0 hours-20 hours, or in the range from 4.0 hours-16 hours, or in the range from 4.0 hours-12 hours, or in the range from 4.0 hours-8.0 hours.

While not wishing to be bound by theory, it is believed that the secondary thermal processing facilitates collapse of voids that remain after completing the thermal treatment. Upon conclusion of the thermal treatment, it is believed that most of the trapped unreacted doping precursor has reacted with the glass structure and covalently bonded. The probability of foaming is accordingly reduced, so higher temperatures are applied to lower glass viscosity to promote rearrangement of the glass structure to close voids.

In another embodiment, the present method includes pressure treatment of a closed-pore body. The pressure treatment of the closed pore body helps in overcoming the gas pressure force inside the void and at the high temperature enables the collapse of the seeds or voids resulting in void-free glass. The post-sintering high pressure treatment thus helps in obtaining void-free glass preform and in driving reaction of trapped gas-phase doping precursor(s) with the glass structure further to completion. The reaction leads to formation of one or more covalent bonds of trapped doping precursor with the glass and prevents release of the doping precursor upon subsequent processing to draw a fiber or redraw a core cane. As trapped doping precursor reacts, voids become depleted and collapse. Application of pressure to the closed-pore body facilitates closure of voids and promotes densification of the glass structure. Pressure is applied mechanically or by exposing the closed-pore body to a pressurized gas. Pressurized gases include Ar, He, $N_2$, $O_2$, $SiCl_4$, $Cl_2$, inert gases, or combinations thereof.

In different embodiments, the pressure of the gas to which the closed-pore body is exposed is at least 1.1 atm, or at least 2.0 atm, or at least 5.0 atm, or at least 10.0 atm, or at least 20.0 atm, or at least 50.0 atm, or at least 75.0 atm, or at least 100 atm, or at least 125 atm, or at least 150 atm, or at least 175 atm, or in the range from 1.1 atm-200 atm, or in the range from 1.5 atm-190 atm, or in the range from 2.0 atm-180 atm, or in the range from 5.0 atm-160 atm, or in the range from 10.0 atm-140 atm, or in the range from 20.0 atm-120 atm, or in the range from 40.0 atm-100 atm.

The time period of the pressure treatment is at least 1.0 hour, or at least 2.0 hours, or at least 3.0 hours, or at least 4.0 hours, or at least 6.0 hours, or at least 8.0 hours, or at least 12.0 hours, or at least 16.0 hours, or at least 20.0 hours, or in or in the range from 1.0 hour-48 hours, or the range from 1.0 hour-24 hours, or in the range from 1.0 hour-20 hours, or in the range from 1.0 hour-16 hours, or in the range from 1.0 hour-12 hours, or in the range from 1.0 hour-8.0 hours, or in the range from 2.0 hours-48 hours, or the range from 2.0 hours-24 hours, or in the range from 2.0 hours-20 hours, or in the range from 2.0 hours-16 hours, or in the range from 2.0 hours-12 hours, or in the range from 2.0 hours-8.0 hours, or in the range from 4.0 hours-48 hours, or the range from 4.0 hours-24 hours, or in the range from 4.0 hours-20 hours, or in the range from 4.0 hours-16 hours, or in the range from 4.0 hours-12 hours, or in the range from 4.0 hours-8.0 hours.

In a further embodiment, the closed-pore body is subjected to the thermal treatment and/or the secondary thermal processing as well as to the pressure treatment described herein.

Figure 9:
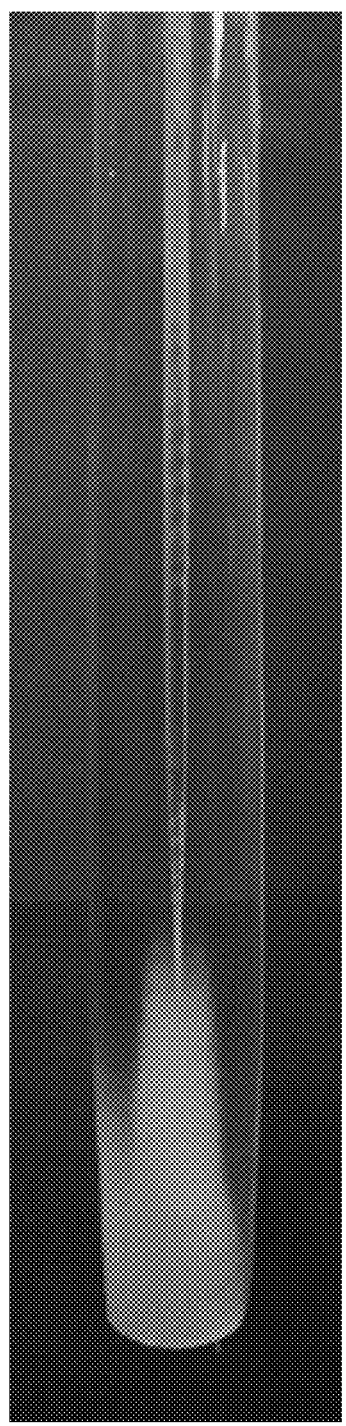
FIG. 9 shows a closed-pore Cl-doped silica body after thermal treatment.

The advantages of the method described herein are illustrated in FIG. 9. FIG. 9 shows a closed-pore core body of Cl-doped silica glass made in the same manner as described above for the closed-pore core body of Cl-doped silica glass shown in FIG. 6 with further thermal and high-pressure treatment in accordance with the present disclosure. Specifically, the closed-pore core body shown in FIG. 9 was made in an OVD process using OMCTS as the silica precursor and SiCl$_4$ as the doping precursor for Cl. A silica soot body was formed on a mandrel and then exposed to SiCl$_4$ to achieve Cl doping. The doping conditions included a partial pressure of SiCl$_4$ of 5.8 atm and a hold time of 90 min at 1440° C. After doping, the core soot body was sintered to a closed-pore state and subsequently subjected to thermal treatment at 1440° C. for 3 hours under an argon atmosphere maintained at a pressure of 10 atmospheres. FIG. 9 shows the resulting closed-pore body. The Cl concentration of the closed-pore body was 3.3 wt %. Optical inspection of the closed-pore body revealed a significantly reduced concentration of gas phase voids in the closed-pore body of FIG. 9 relative to the closed-pore body of FIG. 6. When the closed-pore body shown in FIG. 9 was heated to about 1800° C. in a redraw process, essentially no foaming was observed and a clear core cane was produced (see FIG. 10).

Figure 10:
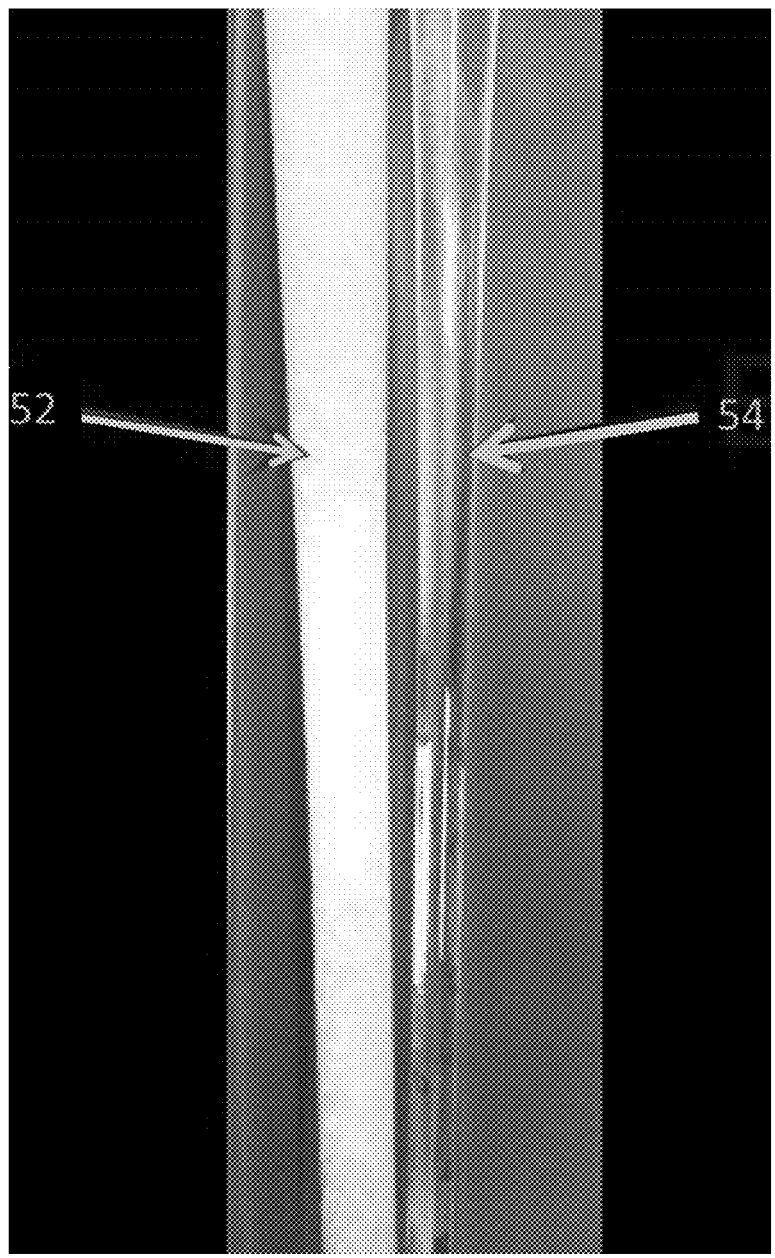
FIG. 10 shows core canes redrawn from the closed-pore Cl-doped silica bodies shown in FIGS. 6 and 9.

FIG. 10 shows redrawn core canes obtained from the closed-pore body shown in FIG. 6 and the closed-pore body shown in FIG. 9. Core cane 52 was obtained by redrawing the closed-pore body shown in FIG. 6 and core cane 54 was obtained by redrawing the closed-pore body shown in FIG. 9. Core cane 52 exhibits significant foaming and has a hazy appearance, while core cane 54 is optically transparent with minimal foaming. Fibers drawn from a preform containing core cane 54 will have fewer defects and superior optical quality than fibers drawn from a preform containing core cane 52. Thermal treatment and/or secondary thermal processing in accordance with the present disclosure leads to improved preform quality and optical fibers having superior performance.

Commencement of drawing or redrawing preferably occurs after conclusion of the thermal treatment or after conclusion of the secondary thermal processing. The temperature of drawing or redrawing is at least 1650° C., or at least 1700° C., or at least 1750° C., or at least 1800° C.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of producing halogen-doped silica, the method comprising:
   doping a silica soot body with a doping precursor, the doping precursor comprising a halogen and having a partial pressure greater than 2 atm, the doping occurring at a temperature between 1000° C. and 1500° C.; and
   densifying the doped silica soot body to form a closed-pore silica body; the closed-pore silica body comprising silica doped with the halogen; and
   exposing the closed-pore silica body to a gas for a time period of at least 1.0 hour, the gas having a pressure of at least 2.0 atm; and
   after the exposing, redrawing the closed-pore silica body, the redrawing comprising heating the closed-pore silica body and reducing a diameter of the closed-pore silica body.

2. The method of claim 1, wherein the gas has a pressure of at least 5.0 atm.

3. The method of claim 1, wherein the gas has a pressure of at least 20.0 atm.

4. The method of claim 1, wherein the halogen comprises chlorine.

5. The method of claim 4, wherein the concentration of chlorine in the closed-pore silica body is at least 2.0 wt %.

6. The method of claim 1, wherein the halogen comprises bromine.

7. The method of claim 6, wherein the concentration of bromine in the closed-pore silica body is at least 2.0 wt %.

8. The method of claim 1, wherein the closed-pore silica body comprises unreacted doping precursor, the unreacted doping precursor comprising the halogen and occupying a void or interstice of the closed-pore silica body and wherein the exposing the closed-pore silica body to a gas induces a reaction of the unreacted doping precursor with the closed-pore silica body.

9. The method of claim 1, wherein the gas has a pressure of at least 100 atm.

10. The method of claim 1, wherein the gas has a pressure of at least 175 atm.

11. The method of claim 1, wherein the gas is Ar, $N_2$, $O_2$, $Cl_2$, or combination thereof.

12. A method of producing halogen-doped silica comprising:
    doping a silica soot body with a doping precursor, the doping precursor comprising a halogen and having a partial pressure greater than 2 atm, the doping occurring at a temperature between 1000° C. and 1500° C.;
    densifying the doped silica soot body to form a closed-pore silica body; the closed-pore silica body comprising silica doped with the halogen; and
    heating the closed-pore silica body at a temperature in the range from 1000° C.-1500° C. for a time period of at least 1.0 hour.

13. The method of claim 12, wherein the halogen comprises chlorine.

14. The method of claim 13, wherein the concentration of chlorine in the closed-pore silica body is at least 2.0 wt %.

15. The method of claim 12, wherein the halogen comprises bromine.

16. The method of claim 15, wherein the concentration of bromine in the closed-pore silica body is at least 1.0 wt %.

17. The method of claim 12, wherein the time period is at least 4.0 hours.

18. The method of claim 12, wherein the closed-pore silica body comprises unreacted doping precursor, the unreacted doping precursor comprising the halogen and occupying a void or interstice of the closed-pore silica body and wherein the heating the closed-pore silica body induces a reaction of the unreacted doping precursor with the closed-pore silica body.

19. The method of claim 12, further comprising thermal processing of the closed-pore silica body, the thermal processing comprising subjecting the closed-pore silica body to a temperature in the range from 1300° C.-1600° C. for a time period of at least 1.0 hour, the thermal processing commencing after conclusion of the heating.

20. The method of claim 12, further comprising exposing the closed-pore silica body to a gas, the gas having a pressure of at least 2.0 atm.

21. The method of claim 12, wherein the doping precursor has a partial pressure of at least 5.0 atm.

22. The method of claim 12, further comprising drawing or redrawing the closed-pore silica body, the drawing or redrawing comprising heating the closed-pore silica body to a temperature of at least 1700° C., the drawing or redrawing commencing after conclusion of the heating.

* * * * *

UNITED STATES PATENT AND TRADEMARK OFFICE
CERTIFICATE OF CORRECTION

PATENT NO. : 11,261,121 B2
APPLICATION NO. : 16/165633
DATED : March 1, 2022
INVENTOR(S) : Dana Craig Bookbinder et al.

It is certified that error appears in the above-identified patent and that said Letters Patent is hereby corrected as shown below:

On the Title Page

In Column 2, under "Other Publications", Lines 6-7, delete "Aurthority;" and insert -- Authority; --.

Signed and Sealed this
Twenty-sixth Day of December, 2023

Katherine Kelly Vidal
*Director of the United States Patent and Trademark Office*